(No Model.)

W. I. BUNKER.
FLEXIBLE TUBE.

No. 477,503. Patented June 21, 1892.

Witnesses:
Chas. E. Gaylord,
Clifford H. White.

Inventor:
William I. Bunker,
By Banning & Banning & Payson,
Attys.

THE NORRIS PETERS CO., PHOTO-LITHO., WASHINGTON, D. C.

UNITED STATES PATENT OFFICE.

WILLIAM I. BUNKER, OF LA GRANGE, ILLINOIS.

FLEXIBLE TUBE.

SPECIFICATION forming part of Letters Patent No. 477,503, dated June 21, 1892.

Application filed November 7, 1891. Serial No. 411,123. (No model.)

*To all whom it may concern:*

Be it known that I, WILLIAM I. BUNKER, of La Grange, Cook county, Illinois, have invented a new and useful Improvement in Flexible Tubes, of which the following is a specification.

The object of my invention is to provide for reinforcing or strengthening a flexible tube without seriously interfering with its compressibility; and the invention consists in the features and combinations hereinafter described and claimed.

Figure 1:
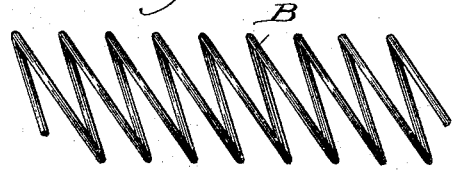
Figure 2:
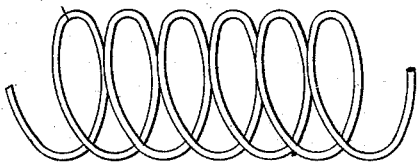
Figure 3:
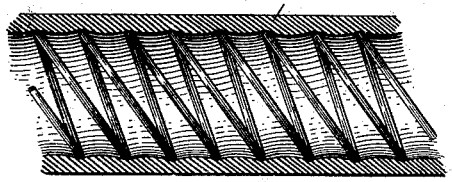
Figure 4:
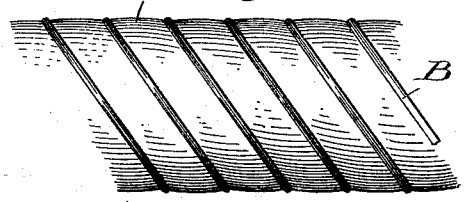
Figure 5:
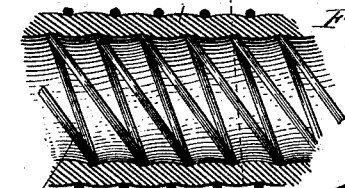
Figure 7:
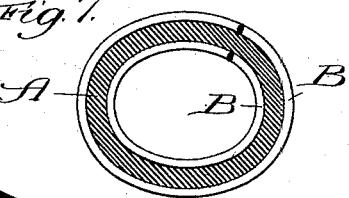
Figure 6:
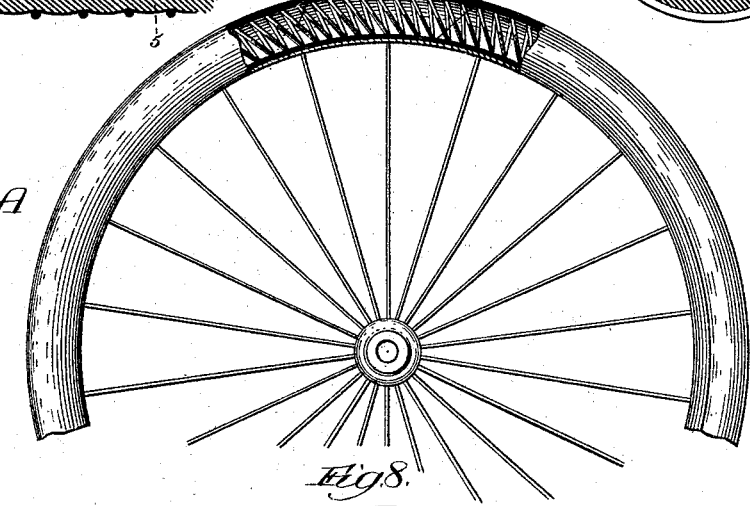
Figure 8:
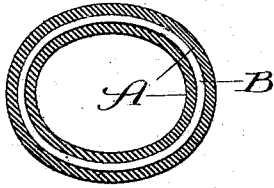

In the accompanying drawings, Figure 1 is a side view of the yielding spring used in my improved flexible tube; Fig. 2, a plan view of the same; Fig. 3, a broken sectional elevation showing the spring inside the tube; Fig. 4, a side elevation showing the spring outside the tube; Fig. 5, a sectional elevation showing two springs, one inside and the other outside the tube; Fig. 6, a broken side elevation of a wheel provided with a tire formed from my improved flexible tube; Fig. 7, a cross-section taken in the line 5 of Fig. 5; Fig. 8, a cross-section of a modified form, in which the spring is located in the body of the tube.

A is the flexible hose, preferably of rubber, and B the reinforcing-spring.

Reinforcing wire coils have heretofore been used in the construction of rubber hose, both on the outside and inside, for the purpose of preventing lateral compression, the coil operating to rigidly hold the rubber out in circular form or to protect it from external wear or injury. In such cases the purpose and effect of the coil has been to prevent compression or flattening of the hose, and this has interfered with its being closely wound either for use or on a reel. The object of my invention is directly the opposite—to provide for reinforcing a flexible tube without interfering with its being compressed or flattened in at least one direction.

I prefer to insert in the tube an open-coil wire spring of suitable size and having its series of coils leaning in the same direction, so that when the tube is fully compressed the coils will come in contact with or press upon or against each other, each coil against the one immediately preceding it. In this way, force being applied to the outside of the tube, the coils are pressed down one upon or against another and of course the tube correspondingly compressed or flattened. Thus, while securing the benefits of an ordinary reinforcing-coil, my peculiar construction of coil forming a compressible elastic spring allows the tube to be flattened to the extent necessary for use or coiling, but at the same time protects it against injury by undue compression. After compression the elasticity or resiliency of the spring, or, as I prefer to call it, "series of springs," will at once cause the tube to resume its circular shape.

As shown in Figs. 1 to 8, inclusive, the reinforcing-spring is made of round or flattened wire formed into an open coil having its loops set at an angle sufficient to permit of compression or flattening—that is, each loop leans to one side of its center at least in one direction. As shown in Fig. 3 the spring is inserted in the tube, and this is the way in which I prefer to use it. As shown in Fig. 4 the spring is outside, encircling the tube. As shown in Figs. 5 and 7 two springs are used, one inside and one outside the tube, and as shown in Fig. 8 a single spring is used, placed in the body of the tube.

In Fig. 6 I have shown my improved tube in the form of an elastic tire for wheels, in which construction I contemplate using it; but of course it will be understood that I also intend to use it in any way and for any purpose to which it may be found applicable.

I have not claimed the spring by itself in this application, but have made that the subject of another application, Serial No. 432,311, filed May 9, 1892.

I claim—

1. A flexible tube provided with a series of springs contiguous to each other, the springs being adapted to lean in the same direction and when subjected to pressure in cross-section to fold one upon the other, and thus change the elastic action of the springs from a longitudinal to a transverse direction, and having sufficient resiliency to resume their normal positions when relieved from pressure, substantially as described.

2. A flexible tube provided with a series of springs contiguous to each other, the springs being adapted to lean in the same direction and when subjected to pressure in cross-section to fold one upon the other, and thus change the elastic action of the springs from a longitudinal to a transverse direction, and having sufficient resiliency to resume their normal positions when relieved from pressure to hold the tube out in its original form and being on the inside of the tube, whereby they are concealed from view and a smooth outside surface is presented, substantially as described.

3. In combination with a wheel, a flexible tire of rubber or other suitable material provided with a series of springs contiguous to each other, the springs being adapted to lean in the same direction and when subjected to pressure in cross-section to fold one upon the other, and thus change the elastic action of the springs from a longitudinal to a transverse direction, and having sufficient resiliency to resume their normal positions when relieved from pressure, substantially as described.

WILLIAM I. BUNKER.

Witnesses:
EPHRAIM BANNING.
SAMUEL E. HIBBEN.